United States Patent [19]

Lind

[11] 3,726,957

[45] Apr. 10, 1973

[54] CONVERSION OF METAL SULFATES TO SULFUR AND SUBSTANTIALLY SULFIDE-FREE SOLID

[75] Inventor: Wilton H. Lind, Walnut Creek, Calif.

[73] Assignee: Chevron Research Company, San Francisco, Calif.

[22] Filed: Feb. 17, 1971

[21] Appl. No.: 116,049

[52] U.S. Cl. ................. 423/170, 423/567, 423/638
[51] Int. Cl. ............................................. C01f 11/08
[58] Field of Search .................... 23/186, 224, 227; 423/170, 567, 638

[56] References Cited

UNITED STATES PATENTS

| | | | |
|---|---|---|---|
| 3,148,950 | 9/1964 | Mugg | 23/224 |
| 3,533,748 | 10/1970 | Finfer et al. | 23/226 |
| 2,863,726 | 12/1958 | Kamlet | 23/224 X |
| 3,607,045 | 9/1971 | Wheelock | 23/186 |

Primary Examiner—G. O. Peters
Attorney—J. Stoner, Jr., G. F. Magdeburger and J. A. Buchanan, Jr.

[57] ABSTRACT

The invention is a method of producing a sulfur-containing product substantially wholly in the form of elemental sulfur and a substantially sulfur-free solid from a metal sulfate of formula $M_x(SO_4)_y$, where M is a metal, $x$ and $y$ are integers, and $2y$ equals the valence of M multiplied by $x$. The process comprises contacting a metal sulfate containing material with a reducing gas which includes carbon monoxide and carbon dioxide, using in the contacting at least enough carbon monoxide to provide a mole ratio of total carbon monoxide contacted to total metal sulfate contacted of at least $3y$, maintaining during the contacting a mole ratio of carbon dioxide to carbon monoxide of at least 1, maintaining during the contacting the concentration of carbon monoxide in the reducing gas at greater than .5 volume percent and substantially excluding sulfur dioxide from the feed to the reducing zone. The process is preferably carried out for a time sufficient to convert at least 90 percent of the metal sulfate to sulfur and a substantially sulfur-free solid. The preferred metal sulfate comprises calcium sulfate.

8 Claims, 1 Drawing Figure

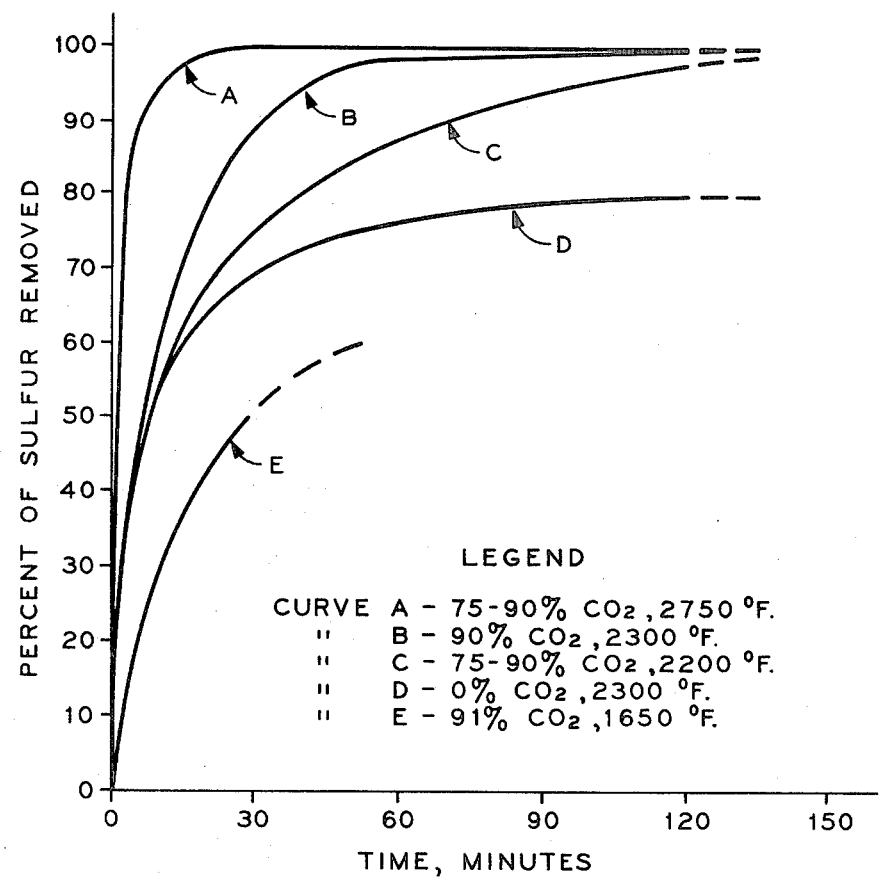

CONVERSION OF METAL SULFATES TO SULFUR AND SUBSTANTIALLY SULFIDE-FREE SOLID

BACKGROUND

This invention is concerned with producing a sulfur-containing product substantially wholly in the form of elemental sulfur and a substantially sulfur-free solid from a metal sulfate, of formula $M_x(SO_4)_y$, where M is a metal, $x$ and $y$ are integers, and $2y$ equals the valence of M in the metal sulfate multiplied by $x$. The preferred metal sulfate comprises calcium sulfate. The sulfur-containing product substantially wholly in the form of elemental sulfur is useful as insulation, a component of paving materials, as a coating to prevent immediate wetting of agricultural agents, as a component of gun powder, as a component of matches, and for many other purposes. Since the product is substantially wholly in the form of elemental sulfur, it is very easy to handle, pack and ship.

The substantially metal sulfide-free solid produced by the method of the invention is also often useful. For example, if the metal sulfate treated is calcium sulfate, as in the preferred embodiment of the invention, the product comprises a substantially calcium sulfide-free solid which, when combined with argillateous materials, forms a cement clinker which is useful as a building material.

The reductive decomposition of metal sulfates is well known in the art. For example, Wheelock et al, in U.S. Pat. No. 3,087,790, disclose passing various combinations of carbon monoxide, carbon dioxide, nitrogen and, in some instances, sulfur dioxide through a gypsum bed and at mole ratios of carbon dioxide to carbon monoxide of up to about 6. It is important to the successful operation of the Wheelock et al process that in the reaction zone the concentration of carbon monoxide is 1–7 percent and the concentration of carbon dioxide is about 5 or more times the concentration of carbon monoxide. Wheelock et al teach that side reactions productive of calcium sulfide increase with the concentration of reducing gas and that the preferred mole ratio of carbon monoxide to calcium sulfate is in the range 1:1 to 2:1. Wheelock et al further teach the desirability of having sulfur dioxide in the reducing gas. The product obtained by the process of Wheelock et al is sulfur dioxide.

In view of the teachings of Wheelock et al, it is indeed surprising that when a metal sulfate, e.g., calcium sulfate, is contacted with a reducing gas which includes carbon monoxide and carbon dioxide in a reducing zone at reducing conditions, using in the contacting at least enough carbon monoxide to provide a mole ratio of total carbon monoxide contacted to total calcium sulfate contacted of at least $3y$, maintaining during the contacting a mole ratio of carbon dioxide to carbon monoxide of at least 1, maintaining the concentration of carbon dioxide in the reducing gas at greater than about 5 volume percent, and substantially excluding sulfur dioxide from the reducing zone, The sulfur-containing product obtained will be substantially wholly in the form of elemental sulfur and the solid obtained will be substantially sulfide free.

SUMMARY OF THE INVENTION

A process has now been developed for producing a sulfur-containing product substantially wholly in the form of elemental sulfur and a solid substantially free of metal sulfide from a metal sulfate-containing material, the metal sulfate being of formula $M_x(SO_4)_y$, where M is a metal, $x$ and $y$ are integers and $2y$ equals the valence of M multiplied by $x$. The process comprises contacting the metal sulfate-containing material with a reducing gas in a reducing zone at reducing conditions. The reducing gas includes carbon monoxide and carbon dioxide. At least enough carbon monoxide is used in the contacting to provide a mole ratio of total carbon monoxide contacted to total metal sulfate contacted of at least $3y$. The mole ratio of carbon dioxide to carbon monoxide is maintained at at least 1 during the contacting. The concentration of carbon monoxide in the reducing gas is preferably greater than 5 volume percent. Sulfur dioxide is substantially excluded from the reducing zone. The process is preferably performed for a time sufficient to convert at least 90 percent of the metal sulfate to the sulfur-containing product substantially wholly in the form of elemental sulfur and the substantially metal sulfide-free solid. The process is preferably conducted at a pressure of 0 to 25 psig and at a temperature above about 2000°F. Generally, somewhat longer times are required at lower temperatures.

BRIEF DESCRIPTION OF THE DRAWING

The FIGURE illustrates for the reduction of calcium sulfate by the method of the invention, the interrelationship between reduction temperature and reduction time, and the criticality of having carbon dioxide, as well as carbon monoxide, as a constituent of the reducing gas.

The invention will be better understood by reading the following description in view of the drawing.

DETAILED DESCRIPTION OF THE INVENTION

The Metal Sulfate

The metal sulfate that can be converted to both a substantially metal sulfide free solid and a sulfur-containing product substantially wholly in the form of elemental sulfur may be any metal sulfate which will not decompose or completely melt under the reaction conditions of the claimed process before it has had time to be contacted with the reducing gas containing carbon monoxide and carbon dioxide. The metal sulfate can be represented by the formula $M_x(SO_4)_y$, where M is a metal, $x$ and $y$ are integers, and $2y$ equals the valence of M, in the compound, multiplied by $x$. Useful metal sulfates include, among others, the sulfates of the metals of Groups II and IV of the Periodic Table. The process is especially useful when the metal sulfate is a metal sulfate selected from the group consisting of the sulfates of calcium, barium, magnesium, strontium, and/or titanium. Most preferably, the metal sulfate is calcium sulfate. When the metal sulfate is calcium sulfate, $x$ and $y$ equal 1. The metal sulfate may be in hydrous or anhydrous form. It may be a synthetically produced metal sulfate or a naturally occurring metal sulfate; such as gypsum. The metal sulfate must, of course, be in a sufficiently finely divided form so that it is effectively contacted by the reducing gas. Preferably, the metal sulfate is in comminuted form.

The Reducing Gas

It is essential to the process of the invention that the reducing gas includes not only carbon monoxide but also carbon dioxide. The mole ratio of carbon dioxide to carbon monoxide must be at least about 1 for the proper operation of the process of the invention. It is also essential to the process of the invention that at least enough carbon monoxide is used during the contacting step of the process to provide a mole ratio of total carbon monoxide contacted to total metal sulfate contacted of at least $3y$. When the metal sulfate is calcium sulfate, at least enough carbon monoxide must be used during the contacting to provide a mole ratio of total carbon monoxide contacted to total calcium sulfate contacted of at least 3. It is preferred that the concentration of carbon monoxide in the reducing gas introduced into the reducing zone is at least about 5 mole percent, more preferably at least about 7 mole percent and most preferably at least about 8 mole percent. More specifically, it is preferred that the concentrations of carbon monoxide and carbon dioxide in the reducing gas added to the reducing zone are at least 5 mole percent each, more preferably at least about 7 mole percent each, and still more preferably at least about 8 mole percent each. The reducing gas may contain in addition to carbon monoxide and carbon dioxide, other non-oxidizing gases, e.g. nitrogen, hydrogen, and water vapor. The presence of these gases does not prevent the reduction of a metal sulfate to elemental sulfur.

The Reducing Zone

It is important to the process of the invention that sulfur dioxide be substantially excluded from the feed to the reducing zone. It is understood, of course, that some sulfur dioxide may be produced in the reducing zone as an intermediate. However, no sulfur dioxide should be added to the reducing zone.

Reducing Conditions

The conditions within the reducing zone should include a temperature above about 2000°F. and preferably above about 2150°F. Generally, the temperature in the reducing zone will be no higher than about 3000°F. and more usually no more than about 2800°F. The exact temperature chosen for the contacting is not critical within the range specified except insofar as avoiding complete melting of the metal sulfate is desirable. Generally, contacting is performed for a longer time at lower temperatures and a lesser time at higher temperatures. When the metal sulfate is calcium sulfate the preferred temperature range is 2000°F. to 3000°F.

The contacting is preferably carried out for a time sufficient to convert at least 90 percent of the metal sulfate, for example calcium sulfate, to a sulfur-containing product substantially wholly in the form of elemental sulfur and a substantially sulfide-free solid; more preferably at least 95 percent of the metal sulfate is converted; and still more preferably at least about 98 percent of the metal sulfide is converted. In some cases contacting time may be as short as 1 minute, but generally, the contacting time will be at least 5 minutes and more usually at least 10 minutes. As FIG. 1 illustrates, at higher temperature these times are sufficient when the metal sulfate is calcium sulfate. Reaction times in excess of 300 minutes are generally unnecessary and uneconomical.

The pressure during the contacting is not critical. Generally, the pressure will lie in the range from about 0 psig to about 25 psig. Usually, the contacting will be carried out at about atmospheric pressure.

The present invention will be better understood with reference to the following example. The example is meant to be illustrative only and, of course, the scope of the invention is not to be limited thereto.

EXAMPLE

Several portions of anhydrous calcium sulfate were each reduced by carbon monoxide. The reduction processes in each case comprised flowing a reducing gas containing carbon monoxide over a comminuted anhydrous calcium sulfate sample. At the end of each process, the percent sulfur left in the sample, which originally was calcium sulfate, was determined by elemental analysis for the total sulfur.

The data obtained is summarized in the following table:

| Run No. | Mole Ratio $CO_2/CO$ | Mole Ratio $CO/CaSO_4$ | Temp. °F. | Time Min. | % Sulfur Removed from $CaSO_4$ |
|---|---|---|---|---|---|
| 1 | 10:1 | 3:1 | 1650 | 30 | 50 |
| 2 | 3:1 | 3:1 | 2200 | 30 | 70 |
| 3 | 6:1 | 3:1 | 2200 | 30 | 74 |
| 4 | 10:1 | 3:1 | 2200 | 30 | 71 |
| 5 | 10:1 | 6:1 | 2200 | 60 | 87 |
| 6 | 3:1 | 12:1 | 2200 | 120 | 98.3 |
| 7 | 0 | 18:1 | 2300 | 30 | 76 |
| 8 | 0 | 36:1 | 2300 | 60 | 72 |
| 9 | 0 | 73:1 | 2300 | 120 | 79 |
| 10 | 9:1 | 7:1 | 2300 | 60 | 98.7 |
| 11 | 9:1 | 14:1 | 2300 | 120 | 99.8 |
| 12 | 3:1 | 3:1 | 2750 | 30 | 99+ |
| 13 | 3:1 | 3:1 | 2750 | 60 | 99+ |
| 14 | 10:1 | 3:1 | 2750 | 60 | 99.8 |

All of the sulfur produced in each run was substantially wholly in the form of elemental sulfur.

The data from Run No. 1 indicates that the calcium sulfate was not sufficiently converted to sulfur at 1650°F.

Runs 2–6 were performed at 2200°F. and with mole ratios of carbon monoxide to calcium sulfate and of carbon dioxide to carbon monoxide within the ranges specified for the process of the present invention. Runs 2, 3, and 4, all of which were run for 30 minutes, show insufficient conversion of calcium sulfate to sulfur. Run 5 which was run for 60 minutes, shows nearly 90 percent conversion of the calcium sulfate to sulfur. Run 6, which was run for 120 minutes, shows over 98 percent conversion of the calcium sulfate to sulfur. It should be noted that simple experimentation shows the time sufficient for converting at least about 90 percent of the calcium sulfate to a solid that is substantially sulfide free and a sulfur-containing product substantially wholly in the form of elemental sulfur.

Runs 7, 8, and 9, were performed at 2300°F. for times of 30, 60 and 120 minutes, respectively. Each of the runs was performed with a relatively large carbon monoxide to calcium sulfate mole ratio. Carbon dioxide was not present in the reducing gas. It is clear that none of these three runs produced sufficient conversion of the calcium sulfate to a calcium sulfide-free solid and a sulfur-containing product substantially wholly in the form of elemental sulfur.

Runs 10 and 11 were also performed at 2300°F. for 60 and 120 minutes, respectively. In each of these two runs, the mole ratio of carbon monoxide to calcium sulfate was lower than the mole ratios used in runs 7, 8 and 9. In each of Runs 10 and 11, sufficient carbon dioxide was present to provide a carbon dioxide to carbon monoxide mole ratio of 9:1. In each of Runs 10 and 11 well over 90 percent of the calcium sulfate was converted to a sulfur-containing product substantially wholly in the form of elemental sulfur and to a substantially calcium sulfide-free solid.

Runs 12, 13 and 14 were each performed at 2750°F. The carbon monoxide to calcium sulfate and carbon dioxide to carbon monoxide mole ratios for each of these runs was well within the range of those taught for the invention. Even for a relatively short reaction time of 30 minutes, as in Run 12, the calcium sulfate was conveted in over 99 percent yield to a sulfur-containing product substantially wholly in the form of elemental sulfur and a substantially calcium sulfide-free solid.

In each of the runs wherein at least 90 percent of the calcium sulfate was converted to the desired products, the reducing gas contained at least about 9 percent carbon monoxide.

While the sulfur-containing products produced according to the invention are substantially wholly in the form of elemental sulfur, it has been noted that trace amounts of other sulfur-containing gases, COS, $H_2S$, and $SO_2$ are also produced.

FIG. 1 was produced by drawing curves to best fit the data of the above table. Curves A, B, and C represent processes performed in accordance with the invention at temperatures of 2750°F., 2300°F., and 2200°F., respectively. Curve D shows the poor results obtained in the absence of carbon dioxide and the necessity for having carbon dioxide as a constituent of the reducing gas. Curve E shows that the process of the invention should preferably be performed at a temperature above about 2000°F.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. In a process for producing both a substantially metal sulfide-free solid and a sulfur-containing product other than metal sulfide which comprises contacting a metal sulfate-containing material, said metal sulfate being represented by the formula $M_x(SO_4)_y$, where M is a metal, $x$ and $y$ are integers, and $2y$ equals the valence of M in the metal sulfate multiplied by $x$, with a reducing gas which includes carbon monoxide and carbon dioxide in a reducing zone at reducing conditions, the improvement comprising:
   a. using in the contacting at least enough carbon monoxide to provide a mole ratio of total carbon monoxide contacted to total metal sulfate contacted of at least $3y$;
   b. maintaining during the contacting a mole ratio of carbon dioxide to carbon monoxide of at least 3 at a temperature of about 2000 to 3000°F.;
   c. substantially excluding sulfur dioxide from the feed to the reducing zone; and
   d. producing the sulfur-containing product substantially wholly in the form of elemental sulfur.

2. A process as in claim 1, further characterized in that the concentration of carbon monoxide in the reducing gas is maintained at greater than about 5 mole percent.

3. A process as in claim 1, further characterized in that the concentration of carbon monoxide in the reducing gas is maintained at greater than about 7 mole percent.

4. A process as in claim 1, further characterized in that it is carried out for a time sufficient to convert at least 90 percent of the metal sulfate to the sulfur-containing product substantially wholly in the form of elemental sulfur and the substantially metal sulfide-free solid.

5. A process in accordance with claim 4, wherein said time is at least about 5 minutes.

6. A process as in claim 1, further characterized in that the contacting is at a pressure within the range from 0 psig to about 25 psig.

7. A process as in claim 1, wherein said metal sulfate is selected from the group consisting of the sulfates of calcium, barium, strontium, magnesium, titanium, and combinations thereof.

8. A process as in claim 7, wherein said metal sulfate comprises calcium sulfate.

* * * * *